United States Patent
Noda et al.

(10) Patent No.: US 10,817,123 B2
(45) Date of Patent: Oct. 27, 2020

(54) OPERATION ASSISTANCE APPARATUS AND OPERATION ASSISTANCE METHOD

(71) Applicant: MITSUBISHI HEAVY INDUSTRIES, LTD., Tokyo (JP)

(72) Inventors: Eisuke Noda, Tokyo (JP); Satoshi Hanada, Tokyo (JP); Yusuke Yamada, Tokyo (JP); Mizuki Kasamatsu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 130 days.

(21) Appl. No.: 15/576,034

(22) PCT Filed: Mar. 25, 2016

(86) PCT No.: PCT/JP2016/059698
§ 371 (c)(1),
(2) Date: Nov. 21, 2017

(87) PCT Pub. No.: WO2016/189954
PCT Pub. Date: Dec. 1, 2016

(65) Prior Publication Data
US 2018/0157378 A1 Jun. 7, 2018

(30) Foreign Application Priority Data
May 26, 2015 (JP) ................... 2015-106775

(51) Int. Cl.
*G06F 3/048* (2013.01)
*G06F 3/0481* (2013.01)
(Continued)

(52) U.S. Cl.
CPC ........... *G06F 3/0481* (2013.01); *G05B 23/02* (2013.01); *G05B 23/0216* (2013.01);
(Continued)

(58) Field of Classification Search
CPC .................................................. G06F 3/0481
See application file for complete search history.

(56) References Cited

U.S. PATENT DOCUMENTS 5,227,121 A * 7/1993 Scarola .................. G21C 17/00
 376/216
5,812,622 A * 9/1998 Chang ..................... G21D 3/00
 376/259
(Continued)

FOREIGN PATENT DOCUMENTS

JP H10289351 A 10/1998
JP 10-319180 A 12/1998
(Continued)

OTHER PUBLICATIONS

International Search Report and Written Opinion in PCT/JP2016/059698, dated May 17, 2016. 14pp.
(Continued)

*Primary Examiner* — David E Choi
(74) *Attorney, Agent, or Firm* — Hauptman Ham, LLP

(57) ABSTRACT

An apparatus includes an image capturing device, a display, a storage, and a controller. In the storage, for an alarm window having plural lit portions that indicate alarms for plural items by lighting, position information and procedure information are stored beforehand, the position information associating a layout of the lit portions, with the respective items, the procedure information being handling procedures for the respective items corresponding to the respective lit portions. The controller displays the alarm window image-captured by the image capturing device on the display, causes an on-display position of any of the lit portions that has been lit to be selectable, and if the on-display position of the lit portion that has been lit is selected, reads out procedure information of the item corresponding to the lit portion from the storage and displays the procedure information on the display.

14 Claims, 12 Drawing Sheets

(51) Int. Cl.
*G05B 23/02* (2006.01)
*G06F 3/14* (2006.01)
*G08B 5/36* (2006.01)
*G21D 3/04* (2006.01)
*G06F 3/0484* (2013.01)
*G06F 3/0488* (2013.01)
*G06F 3/16* (2006.01)
*H04N 5/232* (2006.01)
*H04N 5/445* (2011.01)

(52) U.S. Cl.
CPC ............... *G06F 3/048* (2013.01); *G06F 3/14* (2013.01); *G08B 5/36* (2013.01); *G06F 3/0488* (2013.01); *G06F 3/04842* (2013.01); *G06F 3/167* (2013.01); *G21D 3/04* (2013.01); *H04N 5/23293* (2013.01); *H04N 5/445* (2013.01); *Y02E 30/40* (2013.01)

(56) References Cited

U.S. PATENT DOCUMENTS

| | | | | |
|---|---|---|---|---|
| 2008/0307344 | A1* | 12/2008 | Osaki | G06F 3/0481 715/766 |
| 2012/0329420 | A1* | 12/2012 | Zotti | H04M 1/72541 455/404.2 |
| 2013/0013402 | A1* | 1/2013 | Tanaka | G06Q 30/0265 705/14.49 |
| 2013/0198685 | A1* | 8/2013 | Bernini | G16H 40/63 715/800 |
| 2014/0282195 | A1* | 9/2014 | Nixon | G05B 23/0216 715/771 |
| 2015/0029219 | A1 | 1/2015 | Watanabe | |
| 2015/0037781 | A1* | 2/2015 | Breed | G09B 7/00 434/362 |
| 2016/0077654 | A1* | 3/2016 | Ishikawa | G06F 3/0488 345/174 |
| 2018/0157378 | A1* | 6/2018 | Noda | G05B 23/02 |

FOREIGN PATENT DOCUMENTS

| | | |
|---|---|---|
| JP | 11-96489 A | 4/1999 |
| JP | 2000-270430 A | 9/2000 |
| JP | 2004-134942 A | 4/2004 |
| JP | 2015-11360 A | 1/2015 |
| JP | 2015-22737 A | 2/2015 |

OTHER PUBLICATIONS

Office Action for Japanese Application No. 2017-520275 dated Aug. 28, 2018; 6pp.

* cited by examiner

| A-1 | A-2 | A-3 | A-4 | A-5 | A-6 | A-7 | A-8 | A-9 | A-10 |
|---|---|---|---|---|---|---|---|---|---|
| B-1 | B-2 | B-3 | B-4 | B-5 | B-6 | B-7 | B-8 | B-9 | B-10 |
| C-1 | C-2 | C-3 | C-4 | C-5 | C-6 | C-7 | C-8 | C-9 | C-10 |
| D-1 | D-2 | D-3 | D-4 | D-5 | D-6 | D-7 | D-8 | D-9 | D-10 |
| E-1 | E-2 | E-3 | E-4 | E-5 | E-6 | E-7 | E-8 | E-9 | E-10 |
| F-1 | F-2 | F-3 | F-4 | F-5 | F-6 | F-7 | F-8 | F-9 | F-10 |

OPERATION ASSISTANCE APPARATUS AND OPERATION ASSISTANCE METHOD

RELATED APPLICATIONS

The present application is a National Phase of International Application Number PCT/JP2016/059698, filed Mar. 25, 2016, which claims priority to JP 2015-106775 filed May 26, 2015.

FIELD

The present invention relates to an operation assistance apparatus and an operation assistance method, for obtaining operation information of facilities, the operation information corresponding to each of plural items displayed in an alarm window.

BACKGROUND

Conventionally, for example, a plant abnormality restoration assistance system has been disclosed in Patent Literature 1. In this Patent Literature 1, the following problems are presented. In a plant, such as a nuclear power plant, when an abnormality occurs in the plant, a plant monitoring and control device gives a consolidated alarm by lighting a corresponding alarm window of an initiator (a consolidated alarm display device) installed in a control room or the like, to notify an operator of the abnormality in the plant. According to this consolidated alarm, the operator takes out a failure handling manual, and takes measures against the abnormality according to this manual. However, documents, such as the failure handling manual, are bound in many binders, and there are a dozen of binders for an operation manual in a large-scale power plant or the like. Therefore, although operators and restoration workers carry out training with simulators and the like regularly for measures against failures, there is an immense burden on the operators and restoration workers at the time of abnormality.

Thus, the plant abnormality restoration assistance system of Patent Literature 1 has: an input circuit, through which a failure cause signal is input; a control circuit that subjects, based on a state of the failure cause signal, predetermined information to alarm processing; a display device that receives an alarm display signal from the control circuit via an output circuit and executes individual alarm display corresponding to each failure cause signal; a consolidated alarm display logical circuit that displays respective failure causes that have been consolidated; a flow chart database that indicates a failure restoration method including operations for measures against a generated alarm; and a failure restoration method flow chart display logical circuit that causes, based on the generated alarm, failure restoration method flow chart information in the flow chart database to be displayed on the display device.

Although not related to plants, it has been disclosed, for example, that in an information processing apparatus of Patent Literature 2, a guide for contents is displayed on a display according to an input operation of a user. The guide for contents includes images, sounds, movies, and supplementary information, such as maps related to works. An exhibitor of the contents sets up an AR marker, together with each of the works to be exhibited. The AR marker is set up commonly to the respective works. The information processing apparatus identifies, according to an input operation of a user, contents to be displayed on the display, and plays back sound data and the like for guidance on the identified contents. When the information processing apparatus receives an operation to start AR processing, from the user, and detects the AR marker from captured image data, the information processing apparatus displays AR data on the display.

Further, although not related to plants, in an information processing apparatus of Patent Literature 3, for example, an input image is acquired, a reference object is recognized from the input image, position information indicating a positional relation between the reference object and an image capturing position of the input image is calculated next, display information according to the position information is selected, a display image corresponding to the display information is generated, and the display image is displayed.

CITATION LIST

Patent Literature

Patent Literature 1: Japanese Unexamined Patent Application, Publication No. H10-319180 A Patent Literature 2: Japanese Unexamined Patent Application, Publication No. 2015-11360 A Patent Literature 3: Japanese Unexamined Patent Application, Publication No. 2015-22737 A

SUMMARY

Technical Problem

In the above cited Patent Literature 1, it is described that: since information on how to deal with the generated alarm, that is, a flow chart of a work procedure, is automatically displayed on a displaying means in the plant abnormality restoration assistance system; there will be no need for a failure handling procedure manual written on sheets of paper to be turned over as conventionally done, and prompt operation will be enabled.

However, for example, if a consolidated alarm being a basis of a flow chart is made of plural items in an alarm window being lit, and the flow chart is desired to be checked from information, such as handling procedures for the individual items that have been lit; the failure handling procedure manual written on sheets of paper needs to be turned over. That is, in the plant abnormality restoration assistance system of the above cited Patent Literature 1, for procedures other than that indicated by the flow chart, the procedure manual on sheets of paper must be checked.

The present invention solves the above described problems, and aims to provide an operation assistance apparatus and an operation assistance method that enable information corresponding to each of plural items in an alarm window to be obtained easily.

Solution to Problem

To achieve the above described object, an operation assistance apparatus according to one aspect of the present invention includes an image capturing unit, a display unit, an operation unit that executes operation in association with display on the display unit, a storage unit, in which position information and procedure information are stored beforehand, the position information associating, for an alarm window having plural lit portions that indicate alarms for plural items by lighting, a layout of the respective lit portions, with the respective items, the procedure information being handling procedures for the respective items corresponding to the respective lit portions, and a control unit that: displays, on the display unit, the alarm window image-captured by the image capturing unit; causes an on-display position of any of the lit portions that has been lit to be selectable; and if the on-display position of the lit portion that has been lit is selected by the operation unit, reads out procedure information for the item corresponding to the lit portion from the storage unit and displays the procedure information on the display unit.

This operation assistance apparatus enables information corresponding to each of plural items in an alarm window to be obtained easily. As a result, the information corresponding to each of the plural items in the alarm window is able to be checked, and assistance to the operation of the facilities is able to be carried out smoothly.

In the operation assistance apparatus according to one aspect of the present invention, it is preferable that the control unit fixes, based on an operation of the operation unit, the display of the alarm window image-captured by the image capturing unit on the display unit and the selection of the on-display position of the lit portion that has been lit.

Even if the alarm window is not continued to be image-captured by the image capturing unit, this operation assistance apparatus enables the lit portion that has been lit in the alarm window being displayed on the display unit to be selected.

In the operation assistance apparatus according to one aspect of the present invention, it is preferable that the control unit enables on-display input by operation of the operation unit into the procedure information displayed on the display unit, and stores the input information into the storage unit.

This operation assistance apparatus enables execution of a procedure to be confirmed through the input into the procedure information, and the input to be saved.

It is preferable that the operation assistance apparatus according to one aspect of the present invention further includes a sound input unit. It is preferable that, when a call corresponding to the lit portion that has been lit is input by the sound input unit, the control unit reads out procedure information for the item corresponding to the lit portion from the storage unit and displays the procedure information on the display unit.

This operation assistance apparatus enables the information corresponding to each of the plural items in the alarm window to be obtained promptly, by the input of sound. As a result, assistance to the operation of the facilities is able to be carried out smoothly.

In the operation assistance apparatus according to one aspect of the present invention, it is preferable that plural layout patterns of lighting of the lit portions in the alarm window, respective events corresponding to the respective layout patterns, and respective pieces of event procedure information corresponding to the respective events are stored in the storage unit beforehand, and when a layout pattern of lighting of the lit portions in the alarm window image-captured by the image capturing unit matches a layout pattern selected based on operation of the operation unit, the control unit reads out event procedure information corresponding to an event of the layout pattern from the storage unit and displays the event procedure information on the display unit.

From the layout pattern of the lighting of the lit portions, this operation assistance apparatus causes the event corresponding to the layout pattern to be selected and matched, and the event procedure manual corresponding to the matched event to be displayed on the display unit. As a result, the event procedure manual corresponding to each event is able to be obtained promptly, and assistance to the operation of the facilities is able to be carried out smoothly.

In the operation assistance apparatus according to one aspect of the present invention, it is preferable that respective events corresponding to plural layout patterns of lighting of the lit portions in the alarm window, and respective pieces of event procedure information corresponding to the respective events are stored in the storage unit beforehand, and from a layout pattern of lighting of the lit portions in the alarm window, the control unit determines an event corresponding to the layout pattern, reads out event procedure information corresponding to the determined event from the storage unit, and displays the event procedure information on the display unit.

From the layout pattern of the lighting of the lit portions, this operation assistance apparatus causes the event corresponding to the layout pattern to be automatically determined, and the event procedure manual corresponding to the determined event to be displayed on the display unit. As a result, the event procedure manual corresponding to each event is able to be obtained promptly, and assistance to the operation of the facilities is able to be carried out smoothly.

In the operation assistance apparatus according to one aspect of the present invention, it is preferable that a reference position mark is provided near the alarm window, and the control unit identifies the alarm window based on the reference position mark image-captured by the image capturing unit, and causes an on-display position of the lit portions in the alarm window to be selectable.

This operation assistance apparatus enables the image-captured alarm window to be identified.

It is preferable that the operation assistance apparatus according to one aspect of the present invention further includes a position detection unit that detects mutual position between the alarm window and the image capturing unit. It is preferable that the control unit identifies the alarm window based on the detection of the mutual position by the position detection unit, and causes an on-display position of the lit portions in the alarm window to be selectable.

This operation assistance apparatus enables the image-captured alarm window to be identified.

In the operation assistance apparatus according to one aspect of the present invention, it is preferable that the operation assistance apparatus is integrally configured as a portable terminal.

This operation assistance apparatus enables assistance to the operation of the facilities while allowing movement in a control room, by use of the apparatus that has been made portable.

In the operation assistance apparatus according to one aspect of the present invention, it is preferable that the display unit is a touch panel integrated with the operation unit.

This operation assistance apparatus enables the operation on the display to be carried out easily.

In an operation assistance method according to one aspect of the present invention, position information and procedure information are stored in a storage unit beforehand, the position information associating, for an alarm window having plural lit portions that indicate alarms for plural items by lighting, a layout of the respective lit portions, with the respective items, the procedure information being handling procedures for the respective items corresponding to the respective lit portions. The operation assistance method includes displaying the alarm window image-captured by the image capturing unit on a display unit, and causing on-display positions of the lit portions to be selectable, and if an on-display position of any of the lit portions that has been lit is selected, reading out procedure information of the item corresponding to the lit portion from the storage unit and displaying the procedure information on the display unit.

This operation assistance method enables information corresponding to each of the plural items in the alarm window to be obtained easily. As a result, the information corresponding to each of the plural items in the alarm window is able to be checked, and assistance to the operation of the facilities is able to be carried out smoothly.

Advantageous Effects of Invention

According to the present invention, information corresponding to each of plural items in an alarm window is able to be obtained easily.

DESCRIPTION OF EMBODIMENTS

Hereinafter, a preferred embodiment of an operation assistance apparatus and an operation assistance method, according to the present invention, will be described in detail, by reference to the appended drawings. The present invention is not limited by this embodiment, and when there are plural embodiments, the present invention includes those formed by combination of the respective embodiments.

Figures 1, 2:
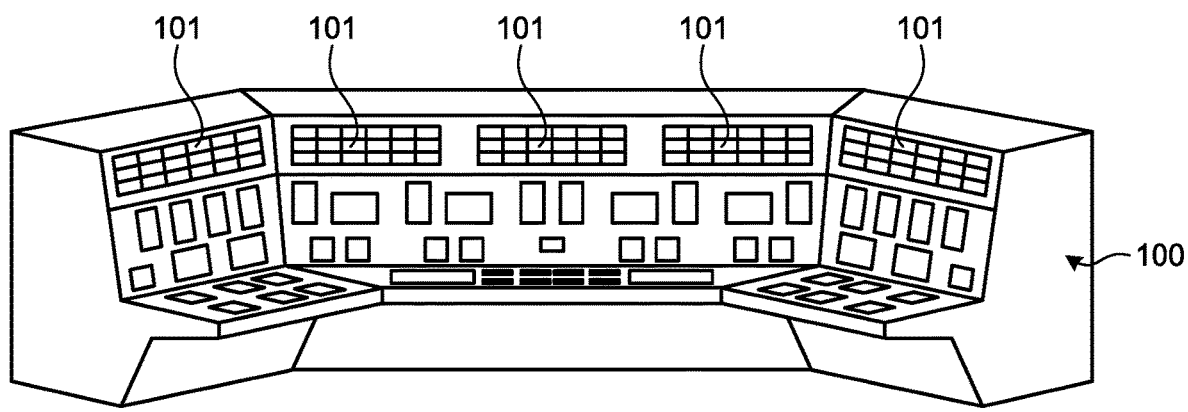
FIG. 1 is a perspective view illustrating an example of a control panel of plant facilities.
FIG. 2 is a schematic diagram illustrating an example of an alarm window of the control panel.

FIG. 1 is a perspective view illustrating an example of a control panel of plant facilities. FIG. 2 is a schematic diagram illustrating an example of an alarm window of the control panel.

A control panel 100 as illustrated in FIG. 1 is installed in, for example, a control room of plant facilities of a nuclear power plant, a thermal power plant, or the like. The control panel 100 used in this kind of plant facilities has an alarm window 101 provided at an upper portion thereof, the alarm window 101 being for notification of operation statuses of the plant facilities.

The alarm window 101 has plural lit portions 101a provided therein side by side, as illustrated in FIG. 2. The respective lit portions 101a have items, such as alarm contents, respectively written on surfaces thereof (in this embodiment, illustrated by signs from A-1 to F-10), and are configured to clearly indicate the items by built-in lamps thereof being lit.

Further, the alarm window 101 of this embodiment has a reference position mark 101b provided near the alarm window 101. The reference position mark 101b is, for example, a two-dimensional bar code, and is included in a part of a configuration of the operation assistance apparatus of this embodiment.

Figure 3:
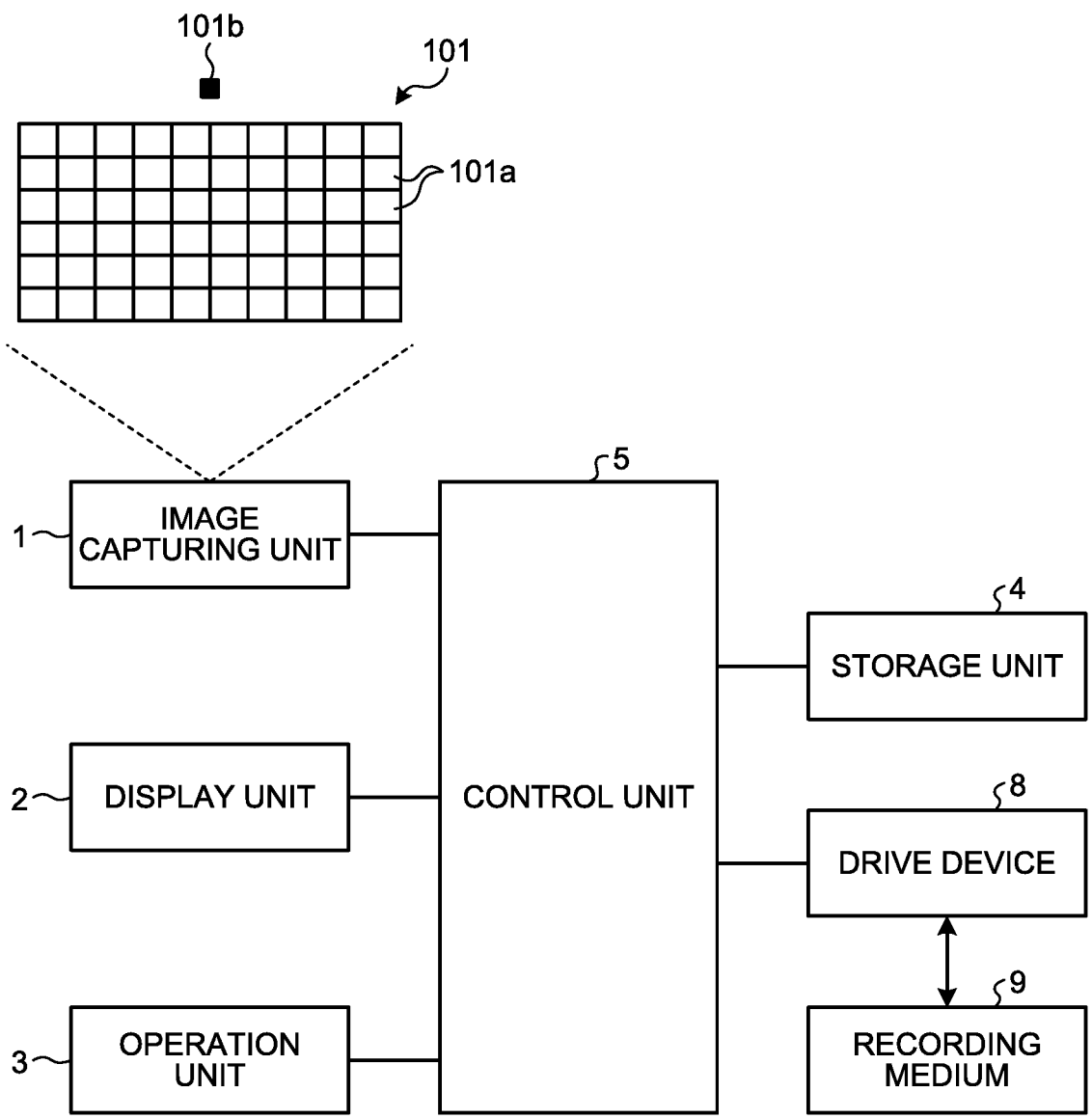
FIG. 3 is a diagram of a configuration of an operation assistance apparatus of an embodiment according to the present invention.

FIG. 3 is a diagram of the configuration of the operation assistance apparatus according to the embodiment. FIG. 5 to FIG. 8 are schematic diagrams illustrating display examples in the operation assistance apparatus of the embodiment.

As illustrated in FIG. 3, the operation assistance apparatus is, for example, a computer, and includes an image capturing unit 1, a display unit 2, an operation unit 3, a storage unit 4, and a control unit 5. Further, the operation assistance apparatus may include a drive device 8.

The image capturing unit 1 is a so-called camera, and is for image-capturing a destination, to which the image capturing unit 1 is oriented.

The display unit 2 is for executing various types of display thereon, and displays thereon a video captured by the image capturing unit 1 in this embodiment.

The operation unit 3 is for making an operation in association with the display on the display unit 2. In this embodiment, the operation unit 3 is integrated with the display unit 2, which is configured as a touch panel. By the display unit 2 being configured as the touch panel and integrated with the operation unit 3, the operation on the display is able to be made easily. The operation unit 3 may also be formed of a mouse, a keyboard, and the like.

The storage unit 4 includes memories, such as a ROM and a RAM, and a storage. The storage unit 4 has position information and procedure information that are stored therein beforehand. The position information is information associating a layout of the respective lit portions 101a with the respective items, for the alarm window 101. The procedure information is handling procedures for the respective items corresponding to the respective lit portions 101a, and is, for example, text data or scan data of a procedure manual that has been filed previously.

The control unit 5 includes a microprocessor, such as a central processing unit (CPU). The control unit 5: causes the display unit 2 to display thereon the video captured by the image capturing unit 1; identifies, based on the display on the display unit 2, the video being displayed; reads out, based on operation by the operation unit 3, information stored in the storage unit 4; and displays the information on the display unit 2.

Figure 4:
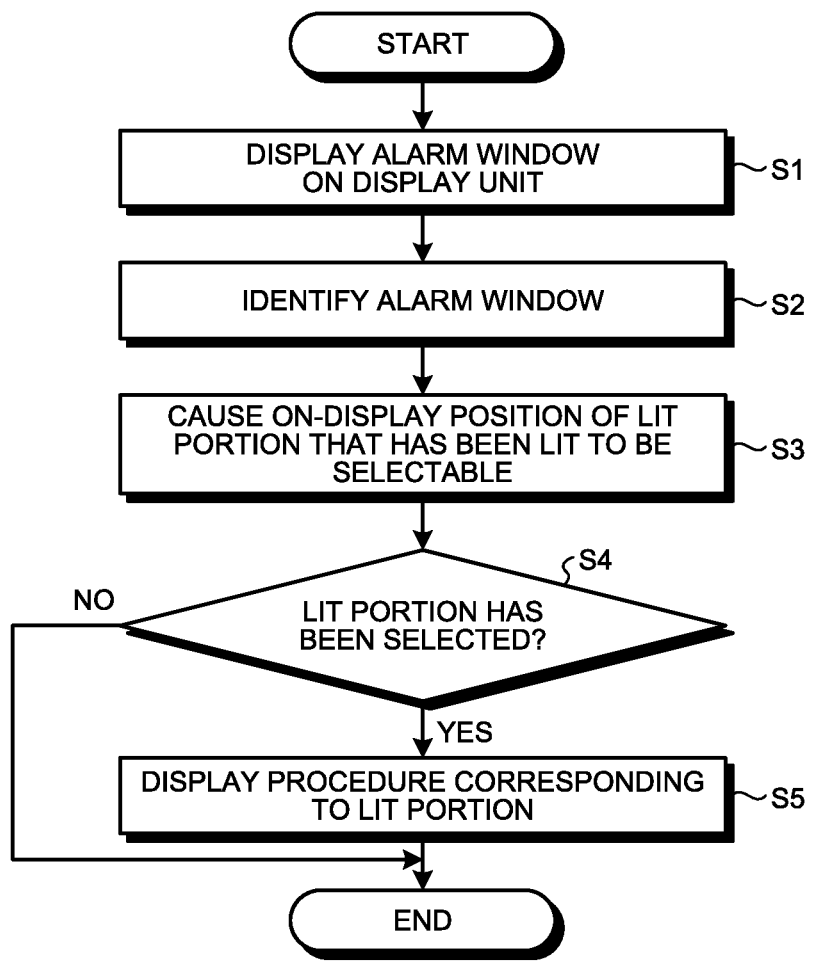
FIG. 4 is a flow chart illustrating an operation assistance method of the embodiment according to the present invention.
Figure 5:
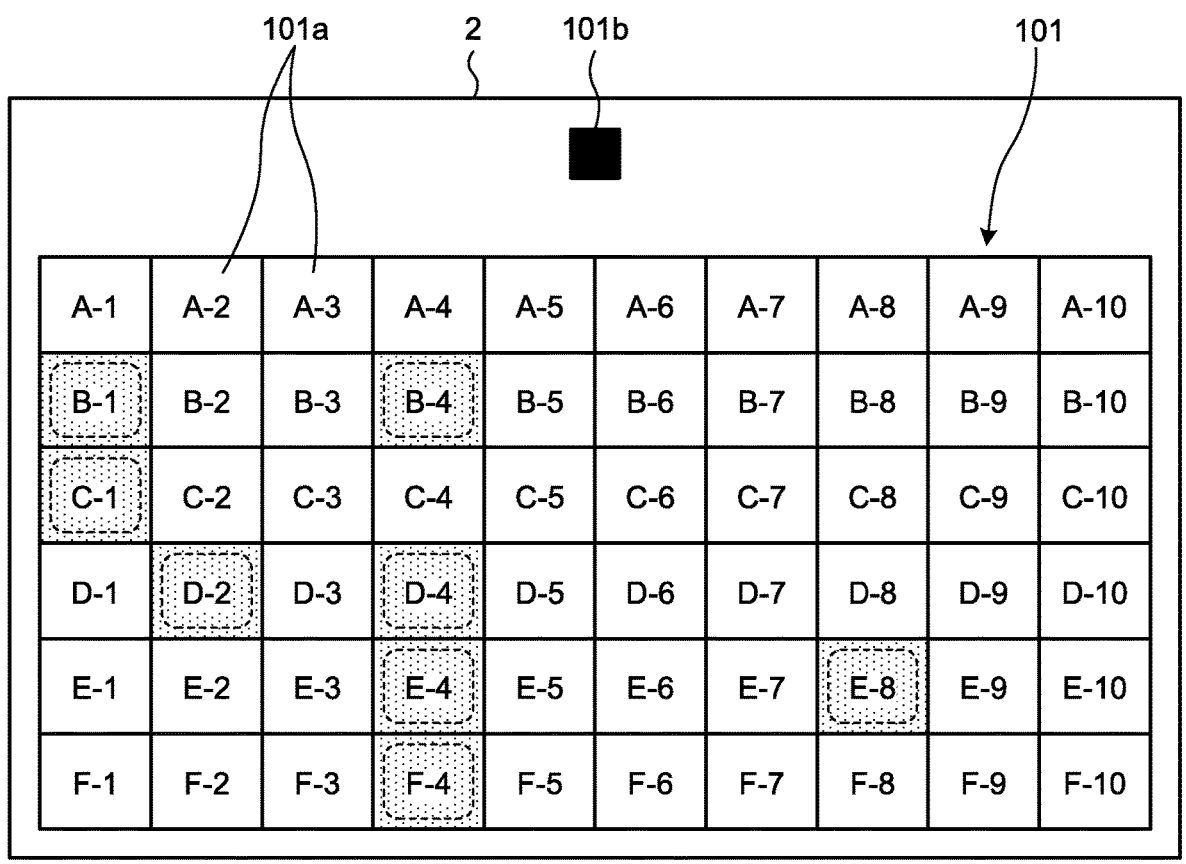
FIG. 5 is a schematic diagram illustrating a display example in the operation assistance apparatus of the embodiment according to the present invention.
Figure 6:
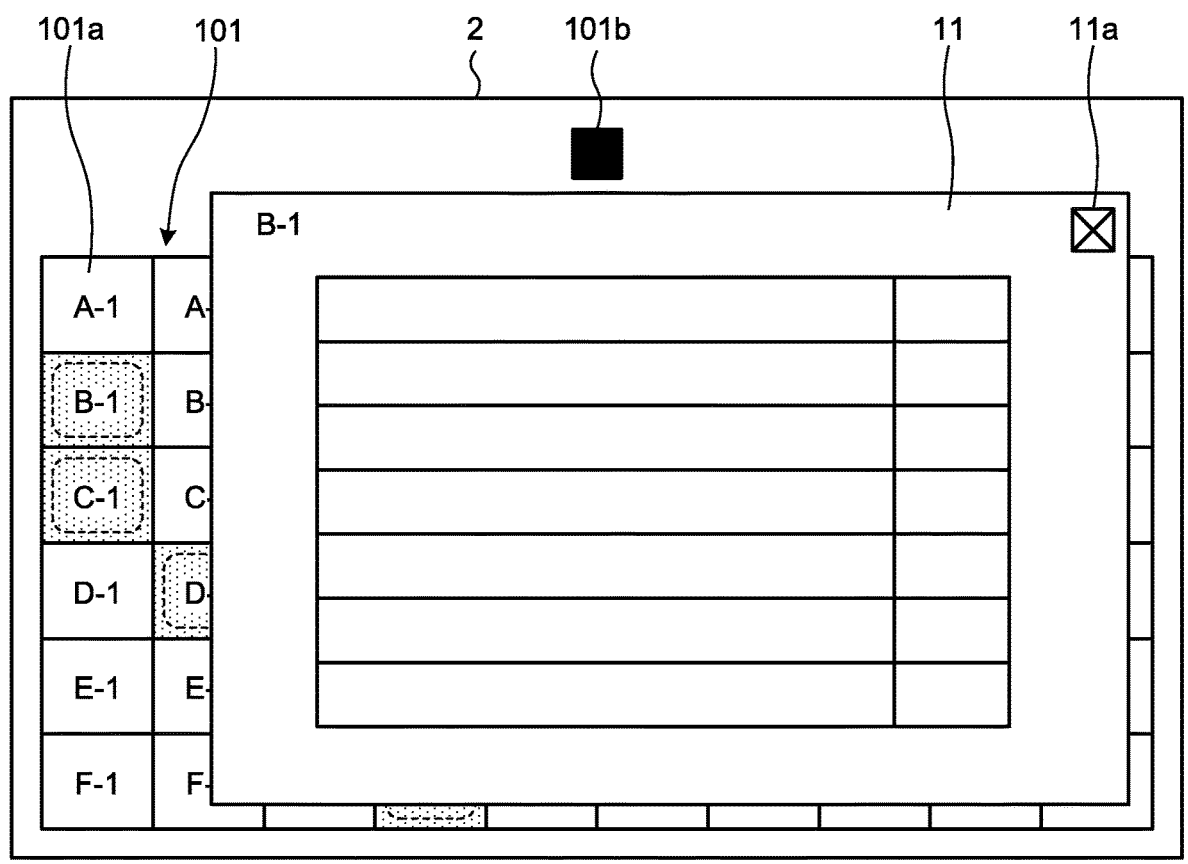
FIG. 6 is a schematic diagram illustrating a display example in the operation assistance apparatus of the embodiment according to the present invention.

Specifically, the control unit 5 executes an operation assistance method illustrated in FIG. 4. As illustrated in FIG. 5, the alarm window 101 image-captured by the image capturing unit 1 is displayed on the display unit 2 (Step S1 in FIG. 4). Further, the control unit 5 identifies, as illustrated in FIG. 5, the alarm window 101, from the reference position mark 101*b* image-captured, together with the alarm window 101, by the image capturing unit 1 (Step S2 in FIG. 4). Furthermore, the control unit 5 causes on-display positions of the lit portions 101*a* that have been lit (in the figure, items B-1, B-4, C-1, D-2, D-4, E-4, E-8, and F-4) to be selectable (Step S3 in FIG. 4). When the on-display positions of the lit portions 101*a* are made selectable, for example, as illustrated in FIG. 5, frames serving as indicators are displayed, so as to surround the lit portions 101*a* at the on-display positions of the lit portions 101*a* that have been lit. The indicators are not limited to the frames. Moreover, when the indicator of any of the lit portions 101*a* that have been lit (for example, the item B-1) is selected by the operation unit 3 (Step S4: Yes, in FIG. 4), as illustrated in FIG. 6, the control unit 5 reads out procedure information (a procedure manual 11) of an item corresponding to the selected lit portion 101*a* from the storage unit 4 and displays the procedure information on the display unit 2 (Step S5 in FIG. 4). The procedure manual 11 displayed on the display unit 2 is eliminated by selection of a cancel button 11*a* illustrated in FIG. 6 through the operation unit 3, and accordingly, the display is able to be returned to the state illustrated in FIG. 5.

The drive device 8 reads out data from a recording medium 9, in which data, such as a program for causing operation of the operation assistance apparatus to be executed, are recorded. As the recording medium 9, any of various types of recording media may be used, such as: a recording medium recording therein information optically, electrically, or magnetically, like a CD-ROM, a flexible disk, or a magneto-optical disk; or a semiconductor memory recording therein information electrically, like a ROM or a flash memory.

As described above, in the operation assistance apparatus of this embodiment, the video of the alarm window 101 captured by the image capturing unit 1 is caused to be displayed on the display unit 2, and when the lit portion 101*a* that has been lit in the alarm window 101 being displayed on the display unit 2 is selected by the operation unit 3, the procedure manual 11 of the item corresponding to the selected lit portion 101*a* is displayed on the display unit 2.

This operation assistance apparatus enables information corresponding to each of the plural items in the alarm window 101 installed in the plant facilities to be obtained easily. As a result, the information corresponding to each of the plural items in the alarm window 101 is able to be checked and assistance to the operation of the plant facilities is able to be carried out smoothly.

In this embodiment, the lit portions 101*a* that have been lit are made selectable, but the lit portions 101*a* that have not been lit may be made selectable. Further, the indicator may be not displayed, and by selection of the lit portion 101*a* on the display through the operation unit 3, the procedure manual 11 for the item corresponding to the lit portion 101*a* may be displayed.

In the above described embodiment, the alarm window 101 is identified from the reference position mark 101*b* image-captured, together with the alarm window 101, by the image capturing unit 1, but limitation is not made thereto. For example, the operation assistance apparatus includes, instead of the reference position mark 101*b*, a position detection unit that detects mutual position between the alarm window 101 and the image capturing unit 1. The position detection unit is, for example, an infrared sensor. The control unit 5 identifies, based on the detection of the mutual position by the position detection unit, the alarm window 101. Further, the control unit 5 causes on-display positions of the lit portions 101*a* in that alarm window 101 to be selectable. Therefore, by the reference position mark 101*b* or the position detection unit, the alarm window 101 image-captured by the image capturing unit 1 is able to be identified.

Figure 7:
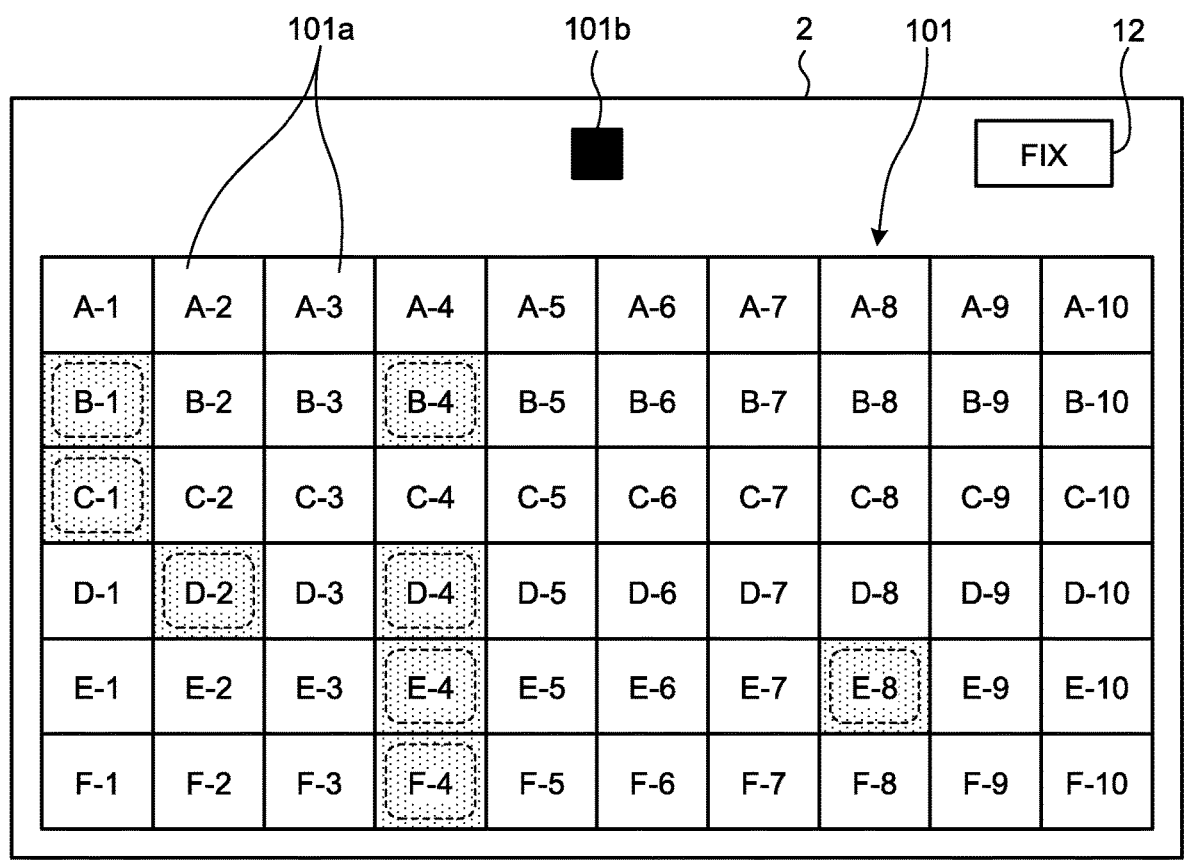
FIG. 7 is a schematic diagram illustrating a display example in the operation assistance apparatus of the embodiment according to the present invention.

In the operation assistance apparatus of this embodiment, as illustrated in FIG. 5, when the control unit 5 displays the alarm window 101 image-captured by the image capturing unit 1, on the display unit 2, identifies the alarm window 101 from the reference position mark 101*b* image-captured, together with the alarm window 101, by the image capturing unit 1, and causes an on-display position of any of the lit portions 101*a* that has been lit to be selectable; as illustrated in FIG. 7, the control unit 5 causes a fix button 12 to be displayed on the display unit 2. If the fix button 12 is selected by the operation unit 3, the control unit 5 then fixes the display in FIG. 5. That is, if the fix button 12 is selected by the operation unit 3, the control unit 5 fixes the display of the alarm window 101, and the indicator on the display of the lit portion 101*a* that has been lit.

Even if the alarm window 101 is not continued to be image-captured by the image capturing unit 1, this operation assistance apparatus enables the lit portion 101*a* that has been lit in the alarm window 101 being displayed on the display unit 2 to be selected.

Figure 8:
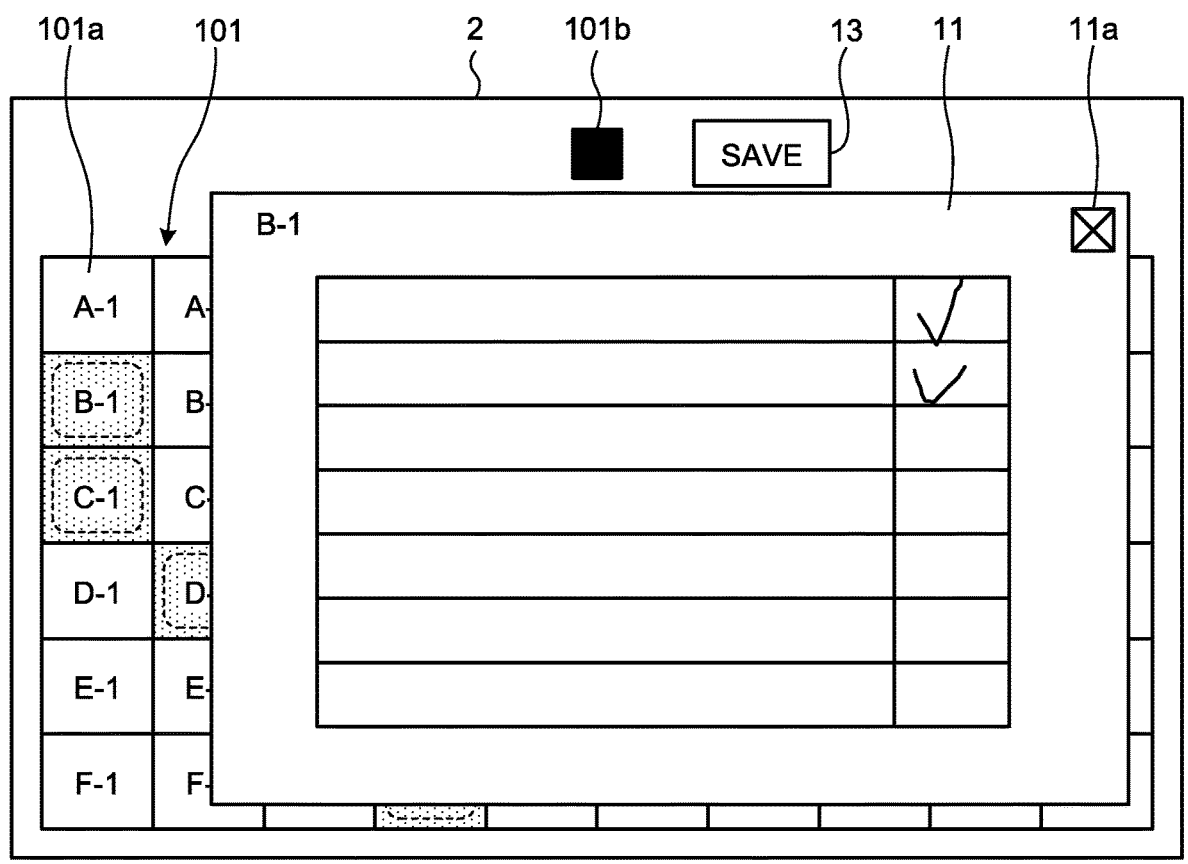
FIG. 8 is a schematic diagram illustrating a display example in the operation assistance apparatus of the embodiment according to the present invention.

Further, in the operation assistance apparatus of this embodiment, as illustrated in FIG. 6, the control unit 5 enables on-display input into the procedure manual 11 displayed on the display unit 2 through operation of the operation unit 3 in a state where the procedure manual 11 has been displayed. As illustrated in FIG. 8, the control unit 5 causes a save button 13 to be displayed on the display unit 2 if the on-display input into the procedure manual 11 has been executed by the operation unit 3. Furthermore, if the save button 13 is selected by the operation unit 3, the control unit 5 stores procedure information of the procedure manual 11 that has been input, into the storage unit 4. The stored procedure information of the procedure manual 11 is stored separately from procedure information of the procedure manual 11 without the input, and is able to be, for example, read out from the storage unit 4, as necessary, by input of input date and time or an identification code of the inputter.

This operation assistance apparatus enables execution of a procedure to be confirmed through input into the procedure information, and this input is able to be saved.

Figure 9:
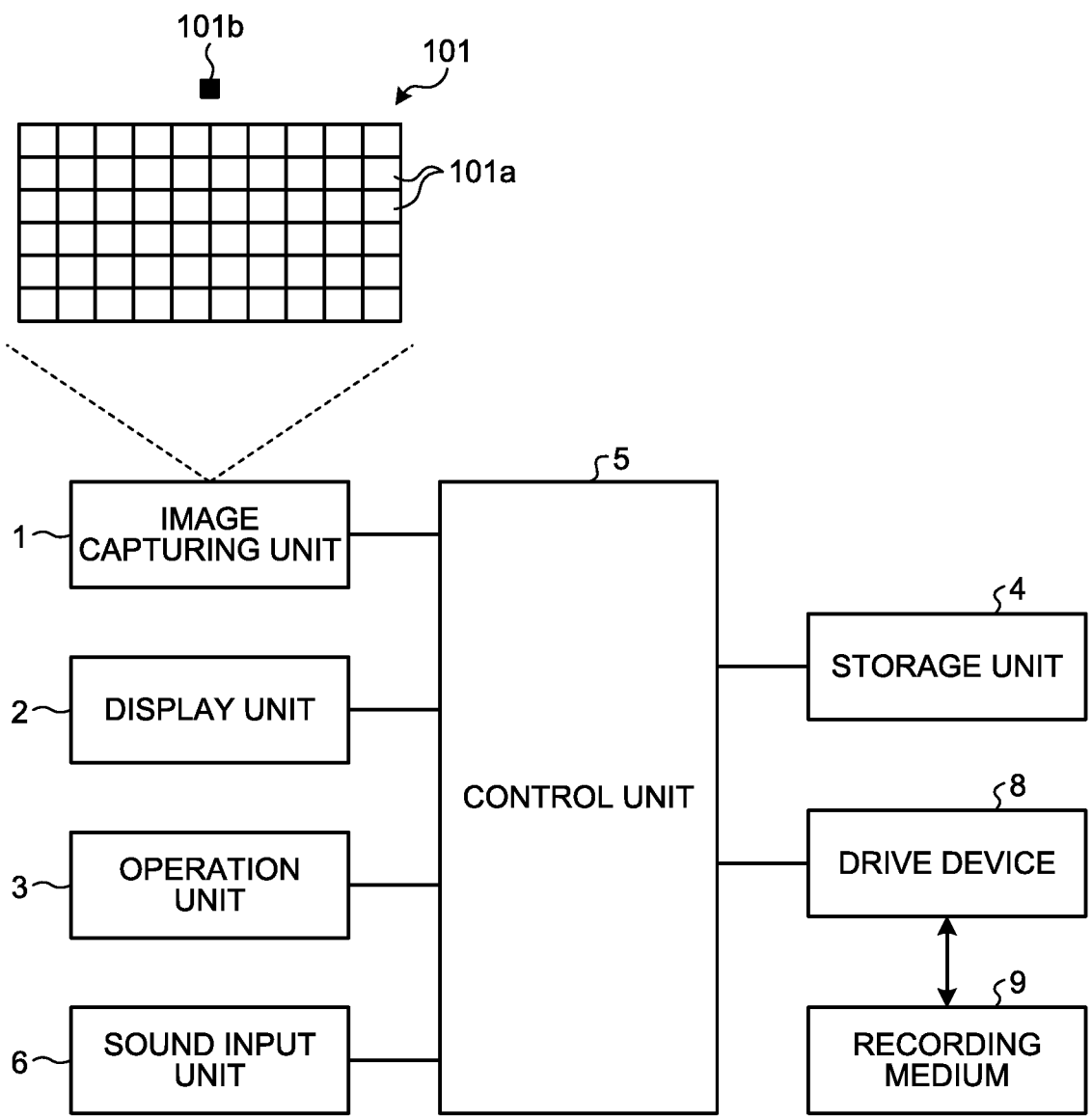
FIG. 9 is a diagram of a configuration of another example of the operation assistance apparatus of the embodiment according to the present invention.

FIG. 9 is a diagram of a configuration of another example of the operation assistance apparatus according to the embodiment.

The operation assistance apparatus of this embodiment further includes, as illustrated in FIG. 9, a sound input unit 6. The sound input unit 6 is a so-called microphone, and inputs sound.

In the control room of the plant facilities, when the lit portion 101*a* in the alarm window 101 is lit, an item corresponding to the lit portion 101*a* is called. As illustrated in FIG. 5, when the control unit 5 displays the alarm window 101 image-captured by the image capturing unit 1, on the display unit 2, identifies the alarm window 101 from the reference position mark 101*b* image-captured, together with the alarm window 101, by the image capturing unit 1, and causes an on-display position of the lit portion 101*a* that has been lit to be selectable; as illustrated in FIG. 7, the control unit 5 causes the fix button 12 to be displayed on the display unit 2. When a call corresponding to the lit portion 101a that has been lit is input by the sound input unit 6, the control unit 5 reads out the procedure manual 11 for the item corresponding to the lit portion 101a from the storage unit 4 and displays the procedure manual 11 on the display unit 2 as illustrated in FIG. 6 even if the on-display position of the lit portion 101a is not selected.

This operation assistance apparatus enables information corresponding to each of the plural items in the alarm window 101 installed in the plant facilities to be obtained promptly by the input of sound. As a result, assistance to the operation of the plant facilities is able to be executed more smoothly.

Similarly to the above described embodiment, after the procedure manual 11 is displayed by the input of sound, input into the procedure manual 11 and saving thereof may be carried out.

Figure 10:
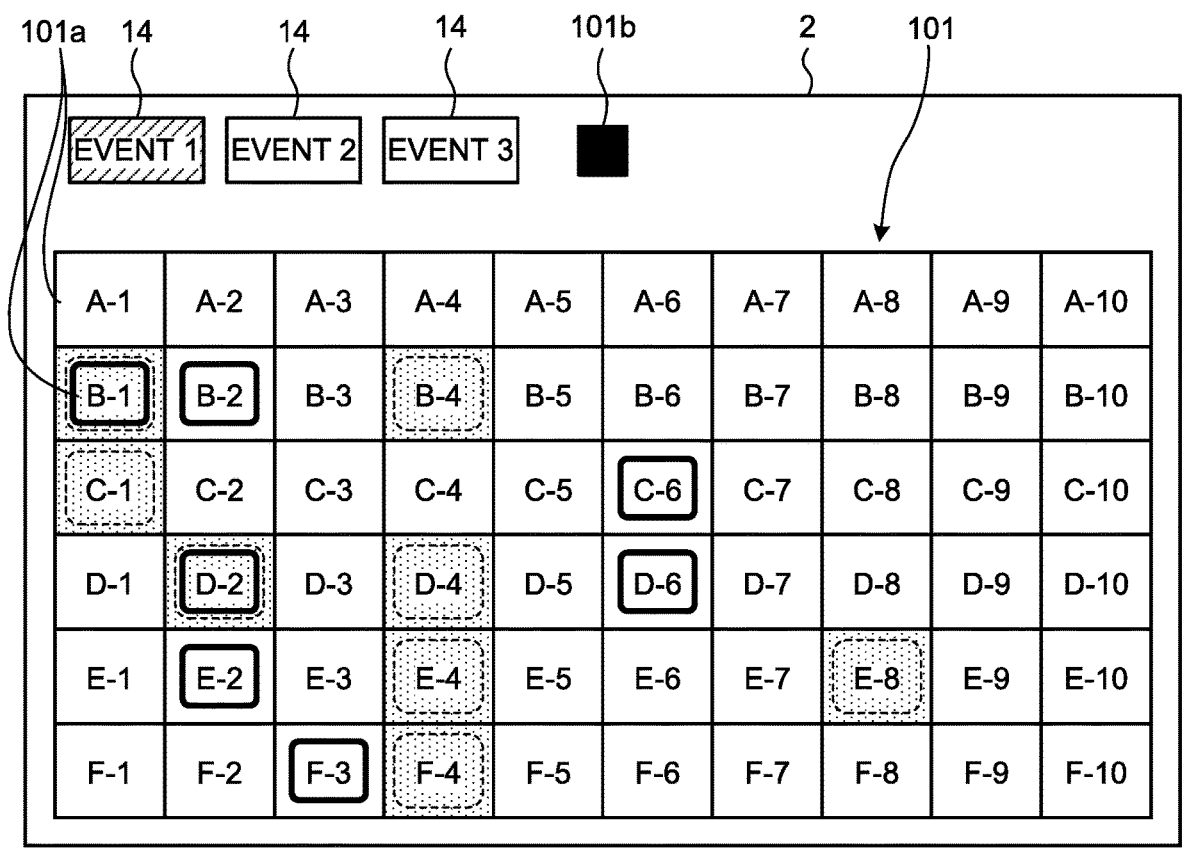
FIG. 10 is a schematic diagram illustrating a display example in the operation assistance apparatus of the embodiment according to the present invention.
Figure 11:
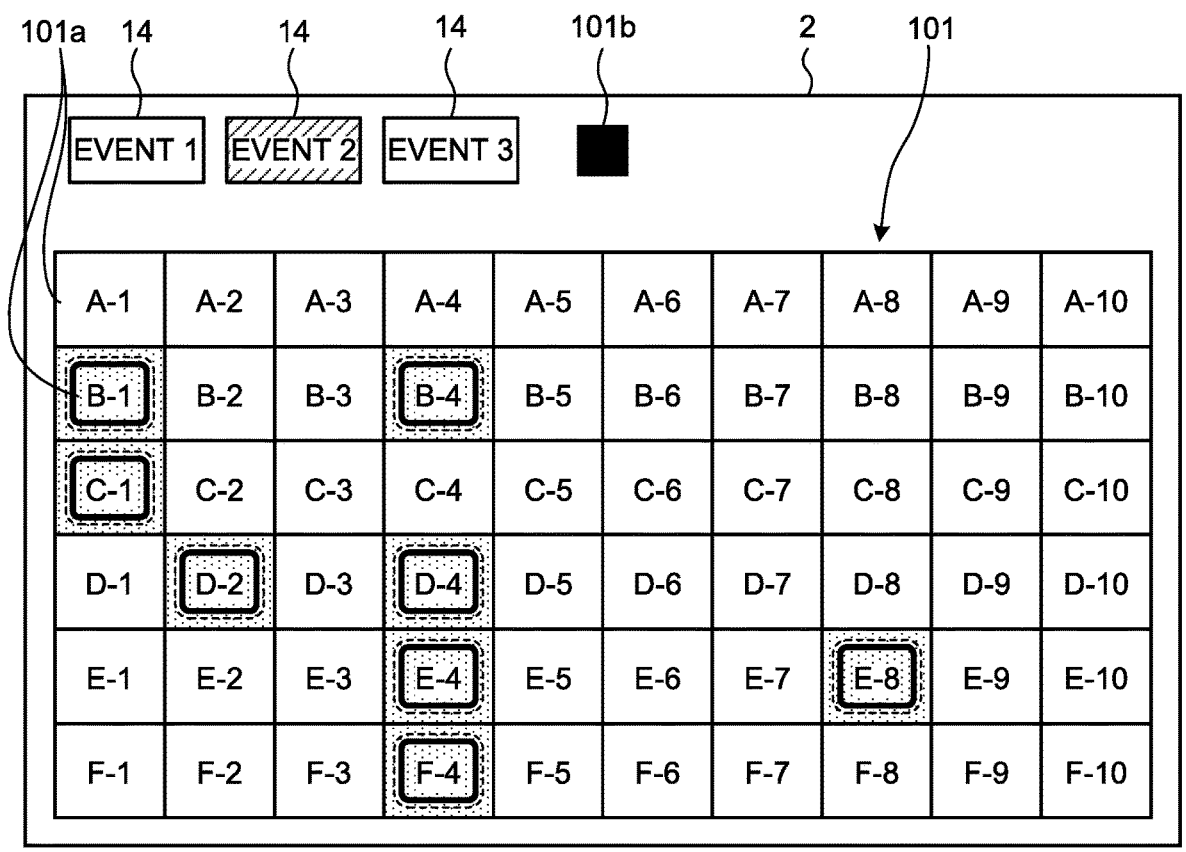
FIG. 11 is a schematic diagram illustrating a display example in the operation assistance apparatus of the embodiment according to the present invention.

FIG. 10 and FIG. 11 are schematic diagrams illustrating display examples in the operation assistance apparatus of the embodiment.

When more than one of the lit portions 101a is lit in the alarm window 101, an event corresponding thereto is able to be identified by a combination thereof. Since a position of each of the lit portions 101a is fixed, the corresponding event is able to be identified by a layout pattern of the lit portions 101a that are lit.

In the operation assistance apparatus of this embodiment, plural layout patterns for lighting of the lit portions 101a in the alarm window 101, respective events corresponding to the respective layout patterns, and respective pieces of event procedure information that are event handling procedure manuals corresponding to the respective events are stored in the storage unit 4 beforehand.

The control unit 5 causes, as described above, the image capturing unit 1 to image-capture the alarm window 101 and the display unit 2 to display thereon the image-captured alarm window 101. The control unit 5 then displays, as illustrated in FIG. 10 and FIG. 11, respective event buttons 14 corresponding to the respective events, on the display unit 2. If any of the event buttons 14 is selected by the operation unit 3, as illustrated in FIG. 10 and FIG. 11, the control unit 5 displays a layout pattern corresponding to the event button 14 on the display of the display unit 2, correspondingly to the lit portions 101a. In FIG. 10 and FIG. 11, a layout pattern corresponding to the selected event button 14 is clearly indicated with bold lined frames in the lit portions 101a, and in FIG. 10, the layout pattern corresponding to the selected event button 14 does not match the lit portions 101a that have been lit. In contrast, in FIG. 11, the layout pattern corresponding to the selected event button 14 matches the lit portions 101a that have been lit. If the layout pattern corresponding to the selected event button 14 matches the lit portions 101a that have been lit, as illustrated in FIG. 11; the control unit 5 reads out an event procedure manual (not illustrated) corresponding to the event of the layout pattern from the storage unit 4 and displays the event procedure manual on the display unit 2.

In this operation assistance apparatus, from a layout pattern of lighting of the lit portions 101a, an event corresponding to the layout pattern is selected and caused to be matched, and an event procedure manual corresponding to the matched event is able to be displayed on the display unit 2. As a result, an event procedure manual corresponding to each event is able to be obtained promptly, and assistance to the operation of the plant facilities is able to be carried out smoothly.

Further, without displaying the event buttons 14, from a layout pattern of lighting of the lit portions 101a, the operation assistance apparatus is also able to automatically determine an event corresponding to the layout pattern, and to cause the display unit 2 to display thereon an event procedure manual corresponding to the event.

In this case, in the storage unit 4, respective events corresponding to plural layout patterns of lighting of the lit portions 101a in the alarm window 101, and respective pieces of event procedure information corresponding to the respective events are stored beforehand. From a layout pattern of lighting of the lit portions 101a in the alarm window 101, the control unit 5 determines an event corresponding to the layout pattern, reads out, from the storage unit 4, an event procedure manual corresponding to the determined event, and displays the event procedure manual on the display unit 2.

In this operation assistance apparatus, from a layout pattern of lighting of the lit portions 101a, an event corresponding to the layout pattern is automatically determined, and an event procedure manual corresponding to the determined event is able to be displayed on the display unit 2. As a result, an event procedure manual corresponding to each event is able to be obtained promptly, and assistance to the operation of the plant facilities is able to be carried out smoothly.

Figure 12:
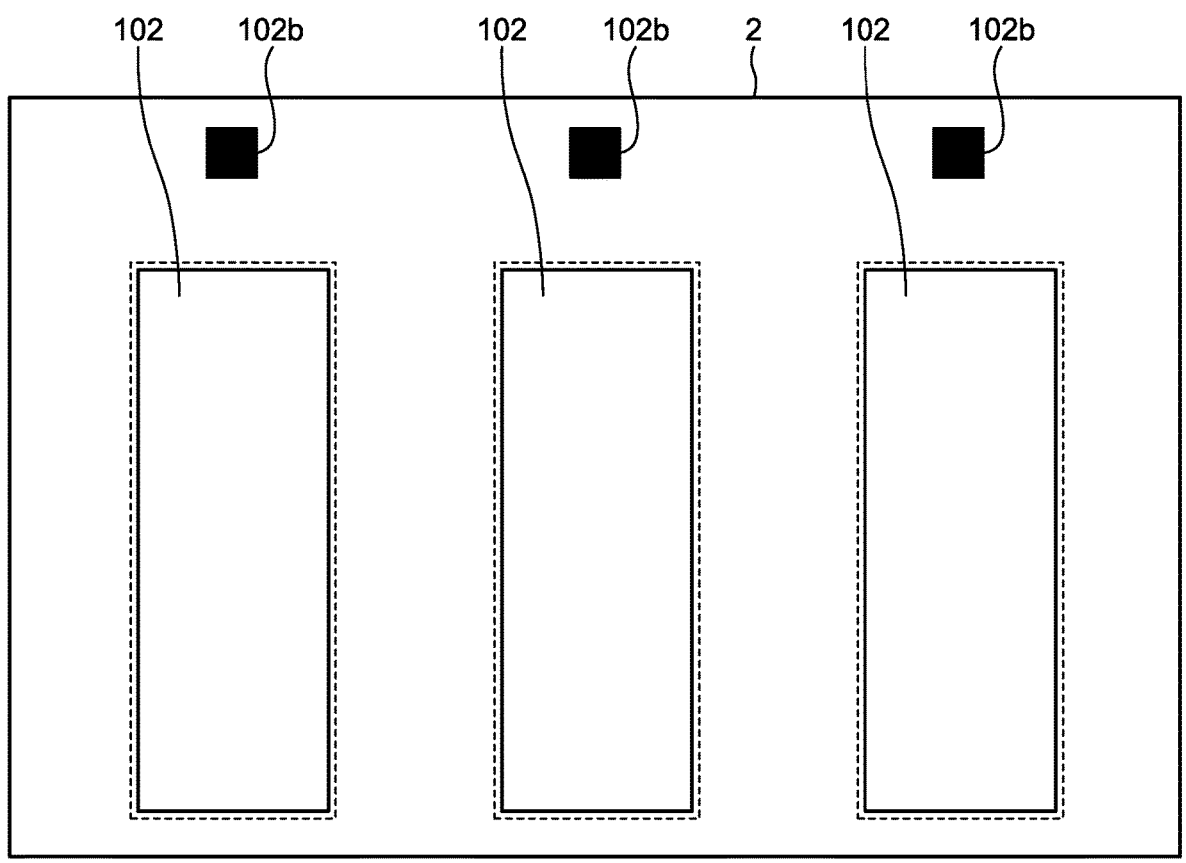
FIG. 12 is a schematic diagram illustrating a display example in the operation assistance apparatus of the embodiment according to the present invention.
Figure 13:
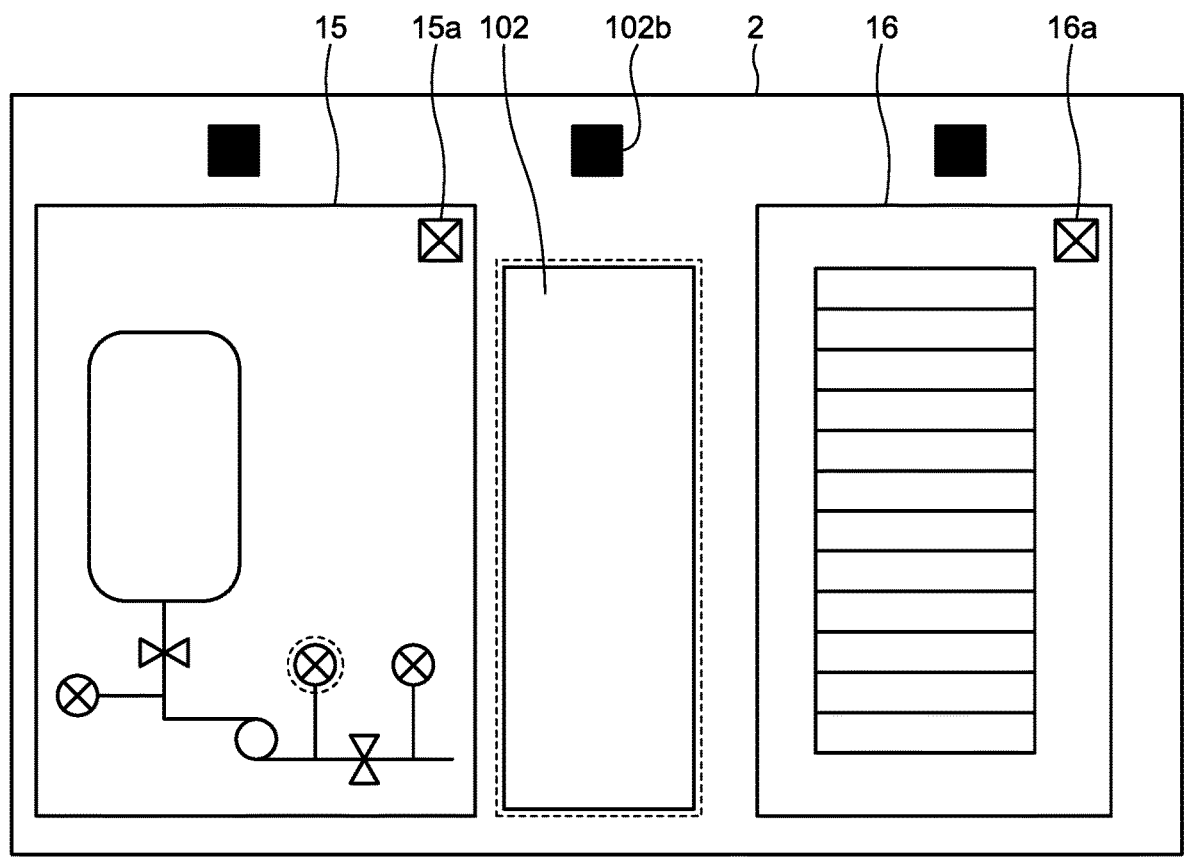
FIG. 13 is a schematic diagram illustrating a display example in the operation assistance apparatus of the embodiment according to the present invention.

FIG. 12 and FIG. 13 are schematic diagrams illustrating display examples in the operation assistance apparatus of the embodiment.

In the above described operation assistance apparatus, based on lighting of the lit portions 101a in the alarm window 101, the lit portions 101a on the display are made selectable, but instead, based on a video captured by the image capturing unit 1, information may be read out from the storage unit 4 and caused to be displayed on the display unit 2.

For example, detection results detected by plural detectors in the plant facilities are presented in detection windows 102 installed in the control panel 100, as illustrated in FIG. 12. The detectors include, for example, a pressure gauge, and in the detection window 102 therefor, a pressure by the pressure gauge is indicated by a pointer. Reference position marks 102b (which may be a position detection unit) that are, for example, two-dimensional bar codes, are provided near the detection windows 102.

The operation assistance apparatus is configured as illustrated in FIG. 3, and as described above, includes the image capturing unit 1, the display unit 2, the operation unit 3, the storage unit 4, and the control unit 5. Further, the operation assistance apparatus may include the drive device 8.

In the storage unit 4, installation position information of the detectors corresponding to the respective detection windows 102, and design information of the detectors is stored beforehand. The installation position information is an installation position diagram 15 (see FIG. 13) clearly indicating a position where the detector is installed in the plant facilities, and the design information is design specifications 16 of the detector (see FIG. 13).

The control unit 5 displays the detection windows 102 image-captured by the image capturing unit 1 on the display unit 2, as illustrated in FIG. 12. Further, the control unit 5 identifies the detection windows 102 from the reference position marks 102b image-captured, together with the detection windows 102, by the image capturing unit 1, as illustrated in FIG. 12. Furthermore, the control unit 5 causes on-display positions of the detection windows 102 to be selectable. When the on-display positions of the detection windows 102 are caused to be selectable, for example, as illustrated in FIG. 12, frames serving as indicators are displayed, so as to surround the detection windows 102, at the on-display positions of the detection windows 102. The indicators are not limited to the frames. Moreover, if an indicator of any of the detection windows 102 (for example, the detection window 102 in the middle illustrated in FIG. 12) is selected by the operation unit 3, as illustrated in FIG. 13, the control unit 5 reads out the installation position diagram 15 and the design specifications 16 for the detector corresponding to the selected detection window 102, from the storage unit 4, and displays them on the display unit 2. The installation position diagram 15 and the design specifications 16 displayed on the display unit 2 may be removed by cancel buttons 15a and 16a illustrated in FIG. 13 being selected by the operation unit 3, and thereby the display may be returned to the state illustrated in FIG. 12.

As described above, the operation assistance apparatus of this embodiment causes the display unit 2 to display thereon a video of the detection windows 102 captured by the image capturing unit 1, and when any of the detection windows 102 displayed on the display unit 2 is selected by the operation unit 3, the installation position diagram 15 and the design specifications 16 corresponding to the selected detection window 102 are displayed on the display unit 2.

This operation assistance apparatus enables information on the detectors installed in the plant facilities and corresponding to the detection windows 102 to be obtained easily. As a result, the information on the detectors corresponding to the detection windows 102 is able to be checked, and assistance to the operation of the plant facilities is able to be carried out smoothly. The display of the detection windows 102, and the indicators on the display of the detection windows 102 may be fixed by the above described fix button 12 also. Further, on-display input into the installation position diagram 15 and design specifications 16 and saving thereof may also be carried out.

It is preferable that the above described operation assistance apparatus is integrally configured as a portable terminal. Therefore, by use of the apparatus that has been made portable, assistance to the operation of the plant facilities is able to be carried out while movement in the control room is allowed.

In the above described embodiment, the operation assistance apparatus is applied to the plant facilities. The operation assistance apparatus may be applied, not only to the plant facilities, but also to various application targets, such as, for example: oil field and gas field plants other than nuclear plants; traffic monitoring facilities for expressways or railways; control facilities for marine vessels; and building management facilities, which include apartment management facilities or which are for commercial facilities. When a lit portion in an alarm window used for management in any of these various facilities is lit, a position of the lit portion on a display of the alarm window image-captured by an imaging unit is selected, and procedure information for an item corresponding to the selected lit portion is caused to be displayed on a display unit. For example, in traffic monitoring facilities, lit portions that indicate traffic jams and accidents on a route map for expressways and the like are available, and by image-capturing of the route map and selection of a position of a lit portion on a display thereof, a manual serving as procedure information corresponding to a traffic jam or an accident is able to be displayed. Further, in control facilities for marine vessels, lit portions that indicate abnormalities are available for a control panel, and by image-capturing of the control panel and selection of a position of a lit portion on a display thereof, a manual serving as procedure information corresponding to an abnormality is able to be displayed. Furthermore, in building management facilities, lit portions that indicate abnormalities are available for a monitoring panel indicating operation statuses of fire warnings and elevators, and by image-capturing of the monitoring panel and selection of a position of a lit portion on a display thereof, a manual serving as procedure information corresponding to an abnormality is able to be displayed. Thereby, information corresponding to a lit portion that has been lit in an alarm window is able to be obtained promptly, and assistance to operation of the facilities is able to be carried out smoothly.

As actual hardware related to a program executed by the operation assistance apparatus, by the control unit 5 reading out and executing the program from the ROM of the storage unit 4; one unit or plural units of the above described respective units are loaded onto the RAM of the storage unit 4, and the one unit or the plural units are generated on the RAM of the storage unit 4. The processing described in the embodiment may be implemented as a program to be executed by the computer. This program may be caused to be installed from a server or the like and executed by the computer, and thereby, the above described processing is able to be implemented. Further, this program may be recorded in the recording medium 9, the recording medium 9 having this program recorded therein may be read by the computer, and the above described processing may be implemented. Although the embodiment has been described in detail above, the present invention is not to be limited to the above described embodiment, and various modifications and changes other than the above described embodiment may be made within the scope stated in the claims.

REFERENCE SIGNS LIST

1 IMAGE CAPTURING UNIT
2 DISPLAY UNIT
3 OPERATION UNIT
4 STORAGE UNIT
5 CONTROL UNIT
6 SOUND INPUT UNIT
11 PROCEDURE MANUAL (PROCEDURE INFORMATION)
11a CANCEL BUTTON
12 FIX BUTTON
13 SAVE BUTTON
14 EVENT BUTTON
100 CONTROL PANEL
101 ALARM WINDOW
101a LIT PORTION

The invention claimed is:
1. An operation assistance apparatus, comprising:
an imager configured to capture an image of a plurality of lit portions of an alarm window of a control panel of a controller installed in a facility, each of the plurality of lit portions indicating alarms for a corresponding item of a plurality of items;
a portable display unit configured to display the image of the plurality of lit portions;
an operation unit configured to execute an operation in association with display on the display unit;
a storage unit configured to store position information and procedure information beforehand, wherein the position information associates the lit portions with a layout of the respective lit portions within the alarm window, and the procedure information indicates handling procedures for the respective items corresponding to the respective lit portions; and a control unit configured to cause the display unit to display the procedure information corresponding to the lit portion, if the lit portion that has been lit is selected by the operation unit, and superimpose a selectable area over each lit portion of the captured alarm window image.

2. The operation assistance apparatus according to claim 1, wherein the control unit enables on-display input by operation of the operation unit into the procedure information displayed on the display unit, and stores the input information into the storage unit.

3. The operation assistance apparatus according to claim 1, further comprising:

a sound input unit, wherein when a call corresponding to the lit portion that has been lit is input by the sound input unit, the control unit reads out procedure information for the item corresponding to the lit portion from the storage unit and displays the procedure information on the display unit.

4. The operation assistance apparatus according to claim 1, wherein plural layout patterns of lighting of the lit portions in the alarm window, respective events corresponding to the respective layout patterns, and respective pieces of event procedure information corresponding to the respective events are stored in the storage unit beforehand, and when a layout pattern of lighting of the lit portions in the image of the alarm window matches a layout pattern selected based on operation of the operation unit, the control unit reads out event procedure information corresponding to an event of the layout pattern from the storage unit and displays the event procedure information on the display unit.

5. The operation assistance apparatus according to claim 1, wherein respective events corresponding to plural layout patterns of lighting of the lit portions in the alarm window, and respective pieces of event procedure information corresponding to the respective events are stored in the storage unit beforehand, and from a layout pattern of lighting of the lit portions in the alarm window, the control unit determines an event corresponding to the layout pattern, reads out event procedure information corresponding to the determined event from the storage unit, and displays the event procedure information on the display unit.

6. The operation assistance apparatus according to claim 1, wherein a reference position mark is provided near the alarm window, and the control unit identifies the alarm window based on the reference position mark image-captured by the imager, and causes an on-display position of the lit portions in the alarm window to be selectable.

7. The operation assistance apparatus according to claim 1, further comprising:

a position detection unit that detects mutual position between the alarm window and the image capturing unit, wherein the control unit identifies the alarm window based on the detection of the mutual position by the position detection unit, and causes an on-display position of the lit portions in the alarm window to be selectable.

8. The operation assistance apparatus according to claim 1, wherein the operation assistance apparatus is integrally configured as a portable terminal.

9. The operation assistance apparatus according to claim 1, wherein the display unit is a touch panel integrated with the operation unit.

10. An operation assistance method, comprising:

a step of photographing a plurality of lit portions of an alarm window of a control panel of a controller installed in a facility, each of the plurality of lit portions indicating alarms for a corresponding item of a plurality of items;

a step of displaying the photographed alarm window on a portable display unit;

a step of displaying a procedure information corresponding to a lit portion, if the lit portion that has been lit is selected, wherein a selectable area is superimposed over each lit portion of the photographed control panel, position information and procedure information are stored beforehand, and the position information associates the lit portions with a layout of the respective lit portions within the alarm window, and the procedure information indicates handling procedures for the respective items corresponding to the respective lit portions.

11. The operation assistance apparatus according to claim 1, wherein the control unit is configured to display an event button in response to more than one of the plural of lit portions being lit, the event button defining an event corresponding to the more than one of the plural of lit portions being lit.

12. The operation assistance apparatus according to claim 11, wherein the control unit is configured to display a layout pattern of the plural of lit portions corresponding to the event button on the display unit in response to the event button being selected by the operation unit.

13. The operation assistance apparatus according to claim 1, wherein the control unit is configured to cause the display unit to pop-up the procedure information corresponding to the lit portion, if the lit portion that has been lit is selected by the operation unit.

14. The operation assistance apparatus according to claim 1, wherein the control unit is configured to cause the display unit to display the procedure information corresponding to the lit portion, if the lit portion that has been lit is selected by the operation unit, the procedure information being displayed in the display unit to overlap the plural of lit portions.

* * * * *